W. P. LAY.
MARINE VESSEL.
APPLICATION FILED MAR. 26, 1918.
1,350,259.
Patented Aug. 17, 1920.
2 SHEETS—SHEET 2.
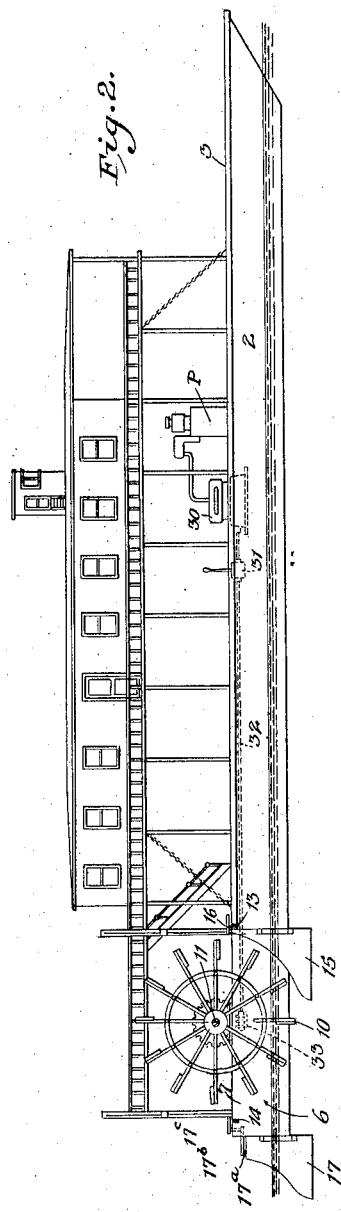
Inventor
William P. Lay
By Mason Fenwick Lawrence,
Attorneys

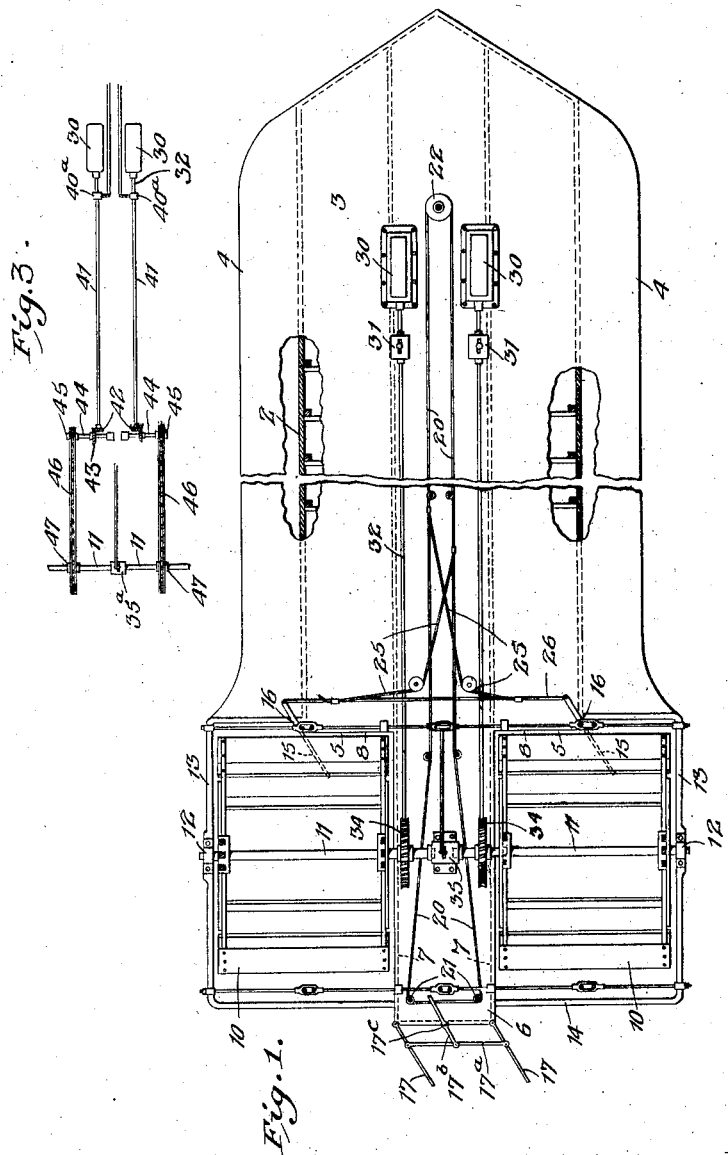

UNITED STATES PATENT OFFICE.

WILLIAM P. LAY, OF GADSDEN, ALABAMA.

MARINE VESSEL.

1,350,259.  Specification of Letters Patent. Patented Aug. 17, 1920.

Original application filed July 28, 1917, Serial No. 183,253. Divided and this application filed March 26, 1918. Serial No. 224,812.

*To all whom it may concern:*

Be it known that I, WILLIAM P. LAY, a citizen of the United States, residing at Gadsden, in the county of Etowah and State of Alabama, have invented certain new and useful Improvements in Marine Vessels; and I do hereby declare the following to be a full, clear, and exact description of the invention, such as will enable others skilled in the art to which it appertains to make and use the same.

This invention relates to marine vessels and more particularly to that type of vessel employing paddle wheels.

An object of the invention is to improve the transmitting mechanism between the propelling wheel or wheels and the power plant of the same, and especially to improve the driving connection between a pair of independently operable wheels so that while either of these may be driven forward or in reverse direction, the wheels may be coupled at will for uniform unidirectional drive through the coöperation of the transmitting means connecting the driving wheels of the vessel to a motor plant.

Another and important object of the invention is to provide a type of transmitting mechanism of the simplest possible construction for the most efficient utilization of the power produced by the power plant to operate the propelling or paddle wheels.

With these and other objects in view as will be rendered manifest in the following specification and clearly apparent to those skilled in the art, there is described in the following specification and illustrated in the accompanying drawings, the preferred form of the invention and also modifications thereof, these modifications involving the general principle of the invention and illustrating that changes in the details of the organization and the construction of the parts and the disposition thereof may be resorted to within the spirit of the invention and the limits of the appended claim.

The invention, therefore, consists in the whole, the combination, and the construction and combination and details of the parts as hereinafter described.

In the drawings:

Figure 1 is a plan view of the main deck of the vessel, the deck partly being broken away to illustrate the position of the side or strake lines of the hull and showing the preferred form of driving mechanism connecting the motor plant and the paddle wheels;

Fig. 2 is a side elevation of the vessel;

Fig. 3 is a plan view showing diagrammatically another modification of the connecting mechanism between the paddle wheels and the power plant.

For the purpose of illustration, I have shown the invention as applied to a vessel of the stern wheel type having a hull structure 2 with a main deck 3 which may be extended laterally of the strakes of the hull to form guards 4. I have found that a very efficient form of propelling organization may be obtained if the stern portion of the hull 2 of the vessel is laterally inwardly recessed as at 5 so as to form a relatively narrow and rearwardly extending stern portion 6 which preferably is of the same depth as the main hull portion 2 and the side walls 7—7 of which may be continued forwardly as indicated by the dotted lines toward or to the bow of the boat hull although obviously the forward extension of the reduced stern portion 6 may be omitted if desired forward of the transverse line 8 at the front end of the recesses of the hull. Mounted in the recesses 5—5 one on each side of the hull are paddle wheels 10 of suitable proportions and construction each having a shaft 11 the outer end of which is mounted in a bearing 12 mounted on a girt 13 which may be extended rearwardly from the guard 4 and the rear end 6 by a beam or beams 14 to secure the desired rigidity and strength to support the shaft of the wheels. Material advantage in efficiency is secured if the wheels 10 are of such width as to project materially beyond the strake or sides of the hull 2 as clearly shown in Fig. 1, so that the projecting portion of the wheels 10 may operate in undisturbed water as the vessel is propelled forwardly, this arrangement securing in effect a semi-side wheel boat with the wheels arranged at the stern of the hull and projecting inwardly from the sides thereof by reason of their location in the recesses 5. One of the important features of my present invention resides in the provision of a system of rudders so that irrespective of whether the paddle wheel or wheels as the case may be is being driven forward or reversed, the back wash from the wheel will be utilized to assist in the turning of the boat by reason of the reaction of the back wash water against an adjacent rudder. To secure this effect, I mount a pair of rudders 15 on rudder posts 16 forward of the paddle wheels 10 the posts being shown as hung on the outer corners of the sides of the hull and at the ends of the transverse stern walls 8 and I also mount on the end of the reduced stern portion 6, a pair of rudders 17 having posts 18 pivoted at the corners of the end of the stern section 6. From this it will be seen that as the paddle wheels are rotated to propel the vessel forwardly, back wash from the wheels reacts against the rudders 17 so that when these rudders are turned in either direction, the reaction of the back wash water will materially aid in turning the boat. When the paddle wheels 10 are being turned to move the boat rearwardly or reverse it, then the back wash of the water from the wheels will react on the rudders 15 and assist in turning the boat. To my knowledge there has been no previous provisions made of rudders so disposed with relation to the propelling device of a vessel as to utilize the back wash from the propelling device or wheel when the latter is rotated in either of its directions during the operation of the vessel. It is obvious, of course, that it is desirable to concurrently swing all of the rudders in a similar direction, and to secure this, the rearmost rudders 17 are shown as connected by any suitable device at any suitable location, as for instance, by the link 17ª, and it may be connected to a lever 17ᵇ pivoted at 17ᶜ, the lever being connected to a tiller rope 20 passed around suitable guide pulleys 21 and then stretched forwardly to and around a drum 22 which may be operated by any suitable system of tiller or steering wheels. To secure the concurrent action of the rudders 15 with the rudders 17, suitable connection is made between the rudders 15 and the tiller rope 20, such means being shown in Fig. 1 as comprising a short length of rope or cable or other suitable flexible element 25 which may be connected to a connecting rod 26 attached to levers on the rudders 15, so that as one stretch of the tiller rope 22 is pulled forwardly and the opposite stretch shifts rearwardly to compensate therefor, the connecting rod or bar 26 of the forward rudder 15 will be shifted properly transversely across the hull to change the angle of and control the rudders 15.

Another important feature of my invention is to provide means for operating and controlling the paddle wheels 10 either independently of each other or for connecting them for coöperation uniformly and unidirectionally in the propulsion of the vessel. To that end a feature of the invention consists in providing a suitable type of power plant shown herein as comprising a motor or motors 30, preferably of the internal combustion type which may be operated with any suitable fuel, and I find that a very economical cost of fuel for this type of engine consists of a gas from a producer plant from which the gas may be led directly to the combustion engine or engines of the power plant. In the form of my invention shown in Fig. 1, I employ two motors 30—30, to the crank shafts of which are connected suitable reverse devices 31 from which lead shafts 32 these extending rearwardly along the hull and mounted in suitable bearings on the reduced hull portion 6 between the wheels 10—10, and having on the ends a worm gear 33 intermeshing with respective worm wheels 34 which are secured on the inner portion of the shafts 11—11 of the paddle wheels. The inner ends of the shafts 11 are brought into close juxtaposition and are adapted to be coupled together by a suitable clutch structure indicated at 35. By this means the two shafts may be positively coupled together so that the wheels can be rotated unidirectionally forward or backward.

One modification of the invention is illustrated in Fig. 3 wherein I employ two motors 30 the jack shafts 32 of which are connected to suitable reverse gears 40ª from which extend shafts 41 having on their ends beveled gears 42 meshing with complementary gears 43 on respective shafts 44 each of which is provided with a sprocket pinion 45 over which runs a chain 46 driving a sprocket wheel 47 which is rigidly connected to a respective paddle wheel shaft 11. From this it will be seen that either wheel is connected with its own motor plant and may be driven in either direction at will and for the purpose of coupling them together for unitary operation in either direction, the inner ends of the shafts 11 are provided with a suitable clutch device 35ª.

While fuel for the motors of the power plant may be derived from any suitable source and at any suitable time, I have shown in the present instance, a gas producer P in Fig. 2, provided for the purpose of supplying fuel to the motors.

It will be seen that in each of the different forms of the transmitting mechanism connecting the power plant to the wheel shafts it is possible to drive each of the wheels entirely independent of the other and in any direction at any rate of speed so that if desired the steering of the vessel may be facilitated by driving one of the wheels in a direction opposite to that of the other or by driving the wheels in the same direction at different rates of speed so that one wheel would have more driving force than the other and, therefore, tend to turn the vessel. It is possible by the forms of drives shown to reverse one wheel while the other is driving ahead.

It will be understood that the tiller control apparatus and also the controlling levers for the various power units, clutches, and reverse gears will be disposed as most convenient to the operator at any point or location on the vessel.

This application is a division of my application filed July 28, 1917, for boat, Serial No. 183,253.

What is claimed as new is:

In combination with the hull of a vessel having its stern recessed inwardly from the sheer planes in the sides to form wheel pockets, paddle wheels arranged within said pockets, independent shafts for each of said wheels, said shafts being axially alined and independent gear wheels upon the inner ends of said shafts, a power plant, lead shafts extending from the power plant to a point directly beneath the gears and the ends of the wheel shafts, worm gears carried by the ends of the lead shafts for engagement with the gears on the wheel shafts, reversing mechanism connected with the lead shafts and disposed between the power plant and the outer ends of said shafts and a clutch mechanism connecting the inner ends of the wheel shafts whereby said shafts are positively connected together so that they can be rotated unidirectly forward or backward.

In testimony whereof I affix my signature.

WILLIAM P. LAY.